United States Patent
Mukherjee

(10) Patent No.: US 9,602,575 B2
(45) Date of Patent: Mar. 21, 2017

(54) MONITORING SOCIAL MEDIA FOR SPECIFIC ISSUES

(71) Applicant: Go Daddy Operating Company, LLC, Scottsdale, AZ (US)

(72) Inventor: Rajatish Mukherjee, Sunnyvale, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 261 days.

(21) Appl. No.: 14/453,856

(22) Filed: Aug. 7, 2014

(65) Prior Publication Data

US 2016/0043913 A1   Feb. 11, 2016

(51) Int. Cl.
H04L 29/08   (2006.01)
H04L 29/06   (2006.01)

(52) U.S. Cl.
CPC .............. *H04L 67/02* (2013.01); *H04L 67/22* (2013.01); *H04L 67/40* (2013.01); *H04L 67/42* (2013.01)

(58) Field of Classification Search
None
See application file for complete search history.

(56) References Cited

U.S. PATENT DOCUMENTS

| | | |
|---|---|---|
| 7,062,492 B1 | 6/2006 | Graham |
| 7,143,048 B1 | 11/2006 | Ruben et al. |
| 7,500,182 B2 | 3/2009 | Kelly |
| 7,500,183 B2 | 3/2009 | Kelly |
| 7,770,122 B1 | 8/2010 | Shaik |
| 8,037,168 B2 | 10/2011 | Schneider |
| 8,356,090 B2 | 1/2013 | Parsons et al. |
| 8,560,665 B2 | 10/2013 | Parsons et al. |
| 2002/0152286 A1 | 10/2002 | Peddu et al. |
| 2003/0172145 A1 | 9/2003 | Nguyen |
| 2004/0059793 A1 | 3/2004 | Gruber et al. |
| 2004/0139170 A1 | 7/2004 | Shen et al. |
| 2004/0199620 A1 | 10/2004 | Ruiz et al. |
| 2005/0147950 A1 | 7/2005 | Ortiz et al. |
| 2005/0216289 A1 | 9/2005 | Parsons et al. |
| 2006/0168127 A1 | 7/2006 | Kelly |
| 2007/0168465 A1 | 7/2007 | Toppenberg et al. |
| 2008/0059607 A1 | 3/2008 | Schneider |
| 2008/0126170 A1 | 5/2008 | Leck et al. |
| 2008/0270486 A1 | 10/2008 | Hind et al. |
| 2009/0094137 A1 | 4/2009 | Toppenberg et al. |
| 2010/0318558 A1 | 12/2010 | Boothroyd |

(Continued)

OTHER PUBLICATIONS

Microsoft Computer Dictionary, 5th Edition, 2002, p. 383.
Margaret Rouse (Crawler, TechTarget: SearchSOA, Apr. 5, 2005). http://searchsoa.techtarget.com/definition/crawler.

*Primary Examiner* — Alex Gofman
*Assistant Examiner* — Umar Mian
(74) *Attorney, Agent, or Firm* — Quarles & Brady LLP

(57) ABSTRACT

Systems and methods of the present invention provide for one or more server computers communicatively coupled to a network and configured to: monitor one or more social media accounts; identify a specific issue common to the social media account(s) (and possibly one or more recommended remedies for the common specific issue); and generate and transmit, to a user of the social media account(s), a report identifying the instance of the common specific issue and, where applicable, the one or more recommended remedies.

8 Claims, 4 Drawing Sheets

(56) References Cited

U.S. PATENT DOCUMENTS

| | | |
|---|---|---|
| 2012/0042010 A1 | 2/2012 | Rosenfield et al. |
| 2012/0072548 A1 | 3/2012 | Kim |
| 2013/0067319 A1 | 3/2013 | Olszewski et al. |
| 2013/0103803 A1 | 4/2013 | Parsons et al. |
| 2014/0149240 A1 | 5/2014 | Ansel et al. |
| 2014/0149845 A1 | 5/2014 | Ansel et al. |
| 2014/0149846 A1 | 5/2014 | Ansel et al. |
| 2014/0297764 A1* | 10/2014 | Skiba ................ H04L 51/32 709/206 |
| 2015/0170152 A1* | 6/2015 | Shaffer ............ G06Q 30/016 705/304 |

* cited by examiner

```
Entity Account Control Panel – Browser                                    □□□
 [←] [→]  http://  [                                                  ]  [  ]

Entity Account Control Panel – examplebusinesswebsite.com

Account Entity Data: Edit

Business Name  [ My Business ]   Business Website  [ mybusiness.com ]  Configure Industry Vertical

[ Restaurant            ▽ ]
    Car Repair Shop
    Doctor's Office

Social Media/ API: Edit

[ Yelp                  ▽ ]       Username:  [ Social1    ]
    Facebook                         Password:  [ ********** ]
    Twitter Synchronize information on this form with the social networking API, or view the API separately.

Social Sentiment, Specific Actionable Issues, Recommended Remedies

Please enter keywords/complaints/remedies, in quotes and separated by commas, you'd liked
   flagged in the dictionary to search your social media and be alerted when they come up ┌──────────────────────────────────────────────────────────────────────────┐
   │ "food poisoning," "bad table location," "long wait," "solution," "fix," "what I've done in these │
   │ situations," "what I would recommend,"                                    │
   └──────────────────────────────────────────────────────────────────────────┘
```

FIG. 4

MONITORING SOCIAL MEDIA FOR SPECIFIC ISSUES

The subject matter of all patent applications is commonly owned and assigned to Go Daddy Operating Company, LLC. All prior applications are incorporated herein in their entirety by reference.

FIELD OF THE INVENTION

The present inventions generally relate to the field of social media and specifically to the field of detecting and identifying common specific issues within the social media's content and recommending remedies to the specific issues.

SUMMARY OF THE INVENTION

The present inventions provide methods and systems comprising one or more server computers communicatively coupled to a network and configured to: monitor one or more social media accounts; identify, within the social media account(s), one or more reports of one or more specific issues common to the social media account(s); and report, to an entity associated with the social media account(s), the specific issue(s). In some embodiments, a recommended remedy to the specific issue(s) may also be identified and reported.

The above features and advantages of the present invention will be better understood from the following detailed description taken in conjunction with the accompanying drawings.

BRIEF DESCRIPTION OF THE DRAWINGS

FIG. 4 illustrates a non-limiting example of a user interface used for monitoring social media for specific issues.

DETAILED DESCRIPTION

Figure 1:
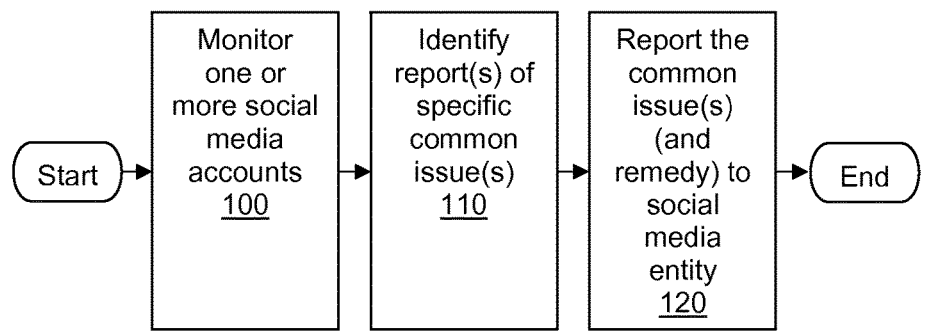
FIG. 1 is a flow diagram illustrating a possible embodiment of a method for monitoring social media for specific issues.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Users of computer networks, such as corporate networks or the Internet, routinely send electronic messages to each other. Electronic messages may contain, for example, text, images, links, and attachments. Electronic mail or email is one of the most widely used methods of communication over the Internet due to the variety of data that may be transmitted, the large number of available recipients, speed, low cost and convenience.

Another method of electronic communication includes social media. Social media such as Facebook, Twitter, YouTube, Tumblr, Snapchat, etc., provide means for businesses to advertise their product, while users of the social media may discover the products or services provided by a business and post comments including general sentiment about their user experience with the business. The business may then review these comments and adjust their business strategy accordingly.

Applicant has determined, however, that presently existing methods and systems for monitoring and analyzing social media provides no means to identify specific issues within the social media that are common to experiences with the business, common to the industry vertical associated with the business and/or common to social sentiment overall.

Applicant has therefore determined that optimal systems and methods may improve on presently-existing systems and methods by providing means to allow businesses to easily monitor social media for specific problems being widely reported so the business owner can fix them.

Several different methods may be used to provide and manage the disclosed inventions. In the example embodiment shown in FIG. 1, one or more server computers communicatively coupled to a network and operated by a hosting provider hosting a plurality of business websites, may comprise one or more software modules running on the server(s). These software modules may be configured to: monitor one or more social media accounts for one or more entities (Step 100); identify, within the social media account(s), one or more reports of one or more specific issues common to the social media account(s) (Step 110) (and possibly one or more recommended remedies for the specific issue(s)); and generate and transmit, to the entity, a report identifying the common specific issue and, where applicable, the recommended remedy (Step 120).

Figure 2:
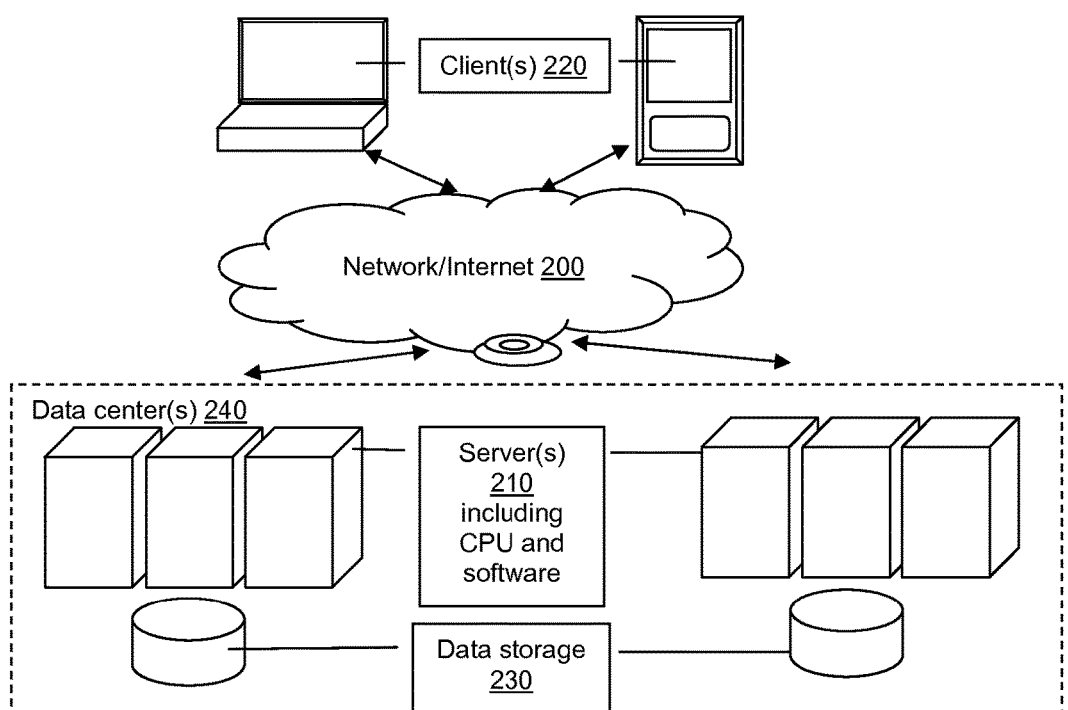
FIG. 2 illustrates a possible system for monitoring social media for specific issues.

Several different environments may be used to accomplish the method steps of embodiments disclosed herein. FIG. 2 demonstrates a streamlined example and FIG. 3 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 210 and/or client 220, and executing instructions stored (perhaps as scripts and/or software, possibly as software modules/components) in computer-readable media accessible to the CPU, such as a hard disk drive on a server 210 and/or client 220.

The example embodiments shown and described herein exist within the framework of a network 200 and should not limit possible network configuration or connectivity. Such a network 200 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 210 and at least one client 220 may be communicatively coupled to the network 200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 210 may comprise any computer or program that provides services to other computers, programs, or users either in the same computer or over a computer network 200. As non-limiting examples, the server 210 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 220.

The server 210 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

Figure 3:
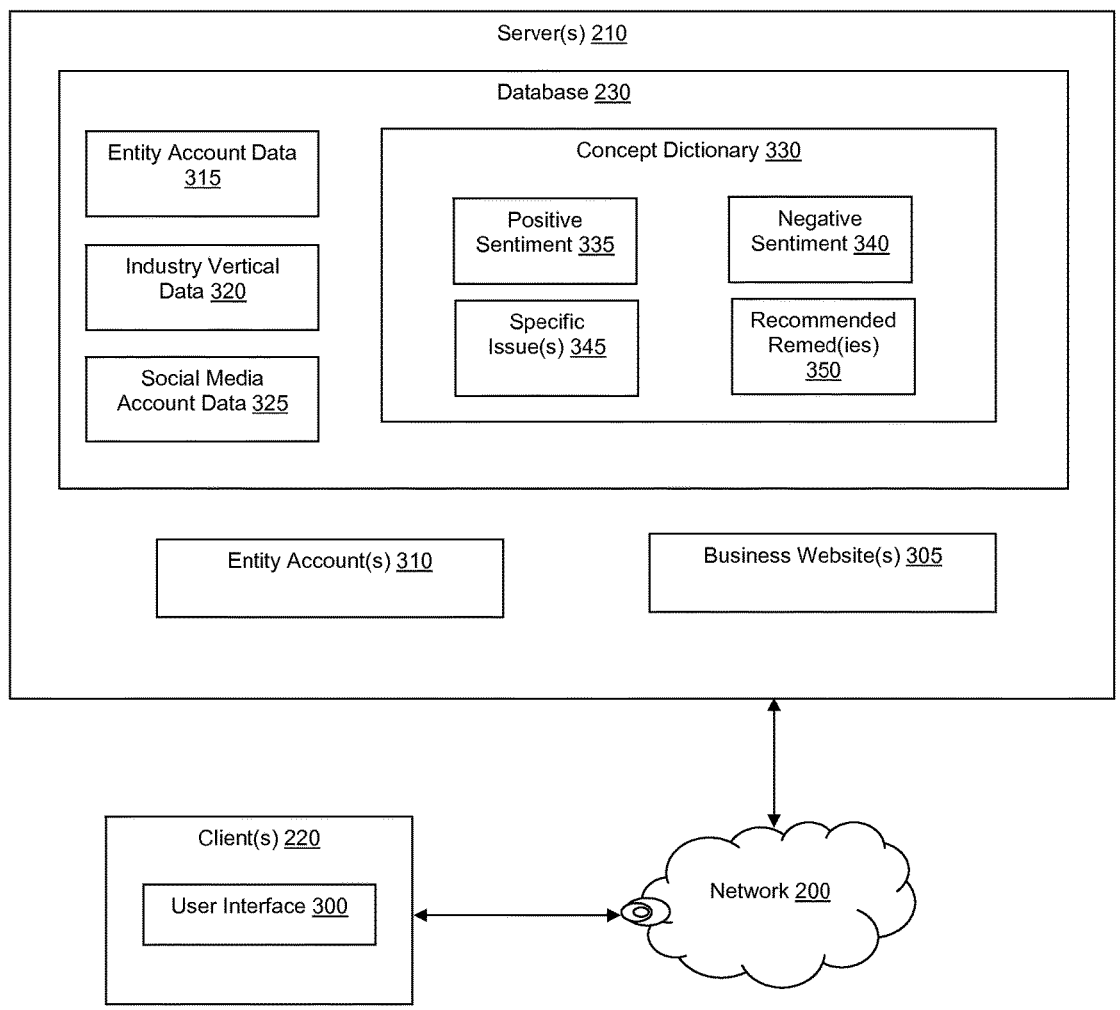
FIG. 3 illustrates a more detailed possible system for monitoring social media for specific issues.

The environment(s) in FIGS. 2-3 may include one or more centralized software modules capable of connecting to any type of software within the environment. In some embodiments, this centralized software may comprise an Application Programming Interface (API) and any request to the API disclosed herein may comprise a Remote Procedure Call (RPC) to the API. An API may comprise a service made available to third parties, which may further comprise any individual, entity, system, hardware, or software wishing to access the disclosed information and functionality.

Such an API may comprise a software-to-software interface that specifies the protocol defining how independent computer programs interact or communicate with each other. It also may comprise a collection of pre-configured building blocks allowing a third party to easily configure their software for compatibility and/or extensibility. The API may allow a requesting party's software to communicate and interact with the software application and/or its provider—perhaps over a network—through a series of function calls (requests for services). It may comprise an interface provided by the software application and/or its provider to support function calls made of the software application by other computer programs.

The API may comprise any API type known in the art or developed in the future including, but not limited to, request-style, Berkeley Sockets, Transport Layer Interface (TLI), Representational State Transfer (REST), Simple Object Access Protocol (SOAP), RPCs, Standard Query Language (SQL), file transfer, message delivery, and/or any combination thereof. The API may comprise computer-readable code that, when executed, causes the API to receive an RPC (i.e., function call) requesting information services. Responsive to receipt of the RPC, the API may perform the above described processes, and transmit request results to the requesting third party.

To submit the request via an RPC to the API, the server(s) 210 may require authentication with the API. Computers or servers may locate the API via an access protected URL mapped to the API, and may then use an API key configured to authenticate the one or more computers or servers prior to accessing the API. Non limiting example programming environments for client applications may include JavaScript/AJAX (client side automation), ASP, JSP, Ruby on Rails, Python's Django, PHP, HTML pages or rich media like Flash, Flex or Silverlight.

The client 220 may be any computer or program that provides services to other computers, programs, or users either in the same computer or over a computer network 200. As non-limiting examples, the client 220 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 220.

The client(s) 220 that may be used to connect to the network 200 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 220 or the server(s) 210 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 210 may be communicatively coupled to data storage 230 including any information requested or required by the system and/or described herein. The data storage 230 may be any computer components, devices, and/or recording media that may retain digital data used for computing for some interval of time. The storage may be capable of retaining stored content for any data required, on a single machine or in a cluster of computers over the network 200, in separate memory areas of the same machine such as different hard drives, or in separate partitions within the same hard drive, such as a database partition.

Non-limiting examples of the data storage 230 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 230 may comprise any collection of data. As non-limiting examples, the data storage 230 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 210 or software modules within the server(s) 210 may use query languages such as MSSQL or MySQL to retrieve the content from the data storage 230. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 210, and any reference to the server(s) 210 being configured to accomplish the disclosed method steps may include the software module(s)/component(s). As non-limiting examples of such software, the paragraphs below describe in detail the software modules/components that make up the software combination. These software modules/components may comprise software and/or scripts containing instructions that, when executed by a microprocessor on a server 210 or client 220, cause the microprocessor to accomplish the purpose of the module/component as described in detail herein. The software combination may also share information, including data from data sources and/or variables used in various algorithms executed on the servers 210 and/or clients 220 within the system, between each module/component of the software combination as needed.

A data center 240 may provide hosting services for the software combination, or any related hosted website including, but not limited to hosting one or more computers or servers in a data center 240 as well as providing the general infrastructure necessary to offer hosting services to Internet users including hardware, software, Internet web sites, hosting servers, and electronic communication means necessary to connect multiple computers and/or servers to the Internet or any other network 200.

FIG. 3 shows a more detailed example embodiment of an environment for accomplishing the systems and method steps disclosed herein. As non-limiting examples, all disclosed software modules may run on the server(s) 210 and may include one or more user interfaces 300 generated by the server(s) 210 and transmitted to and displayed on the client(s) 220. The user interface(s) 300 may be configured to receive input from the user and transmit this input to the server(s) 210 for the processing/administration of the input by the software module(s) and storage of the processed data in data storage 230 associated with the software module(s).

The server(s) 210 may be operated by a hosting provider hosting one or more business websites 305 for a plurality of business accounts. Each of these business websites 305 may be managed by an account and/or business website administrator ("entity"). As non-limiting examples, the entity may be a system administrator, software developer/database administrator for the hosting provider, a business owner, a website owner, a website developer for the business website, any other business or website administrator known in the art or any combination thereof.

Data within data storage 230 may be organized according to any data structure known in the art, and may be associated with any other stored and structured data. As a non-limiting example, the disclosed system may be configured to create one or more data tables within data storage 230 for a grouping of data, such as the data described herein. Each of these data tables may contain one or more data records and each of the data records may comprise one or more data fields, including a unique identifier for the record and additional details about the record.

A non-limiting example may include data fields within a data record associated with a business account and/or website account ("entity account") 310. Each entity account 310 may be populated with additional entity account data 315, such as a unique identifier ("user ID," "business ID," etc.), and details about the account, such as a business name, username, password, first name, last name, physical address, email address, phone number, industry vertical, social media account information, etc.

The server(s) 210 may be configured to work in conjunction with data storage 230 to store data. As non-limiting examples, the previously described user interface(s) 300 may be used to receive input stored in data storage 230 as the entity account data 315, which may include an industry vertical data 320 associated with each entity account 310, social media account data 325 associated with each entity account 310, the industry vertical data 320 and/or social media account data 325, multiple concepts associated with each entity account 310 that may be stored in a "concept dictionary" 330 reflecting customer sentiment 335, 340, concepts reflecting one or more specific issues 345 from negative sentiment 340, and/or concepts reflecting recommended remedies 350 for the specific actionable issue(s) 345.

FIG. 4 shows a non-limiting example user interface 300 configured to receive entity account data 315 related to an entity's business. As a non-limiting example, this entity business data may include an industry vertical data 320 associated with the entity's business, such as a restaurant, car repair shop, doctor's office, etc. In some embodiments, the industry vertical data 320 may be used to limit search results from the concept dictionary 330 for queries regarding stored customer sentiment 335, 340, specific actionable issues 345 related to negative sentiment 340, and/or recommended remedies 350 to the specific issues 345. The server(s) 210 may be configured to use this industry vertical data 320 to flag concepts associated with a specific identified industry vertical and aggregate these concepts in the concept dictionary 330 according to their association with a specific industry vertical.

This aggregated information may then be made available for any future analysis of customer sentiment 335, 340, specific issues 345 and recommended remedies 350 related to the appropriate industry vertical. As non-limiting examples, if multiple entities all associate their business with a "restaurant" industry vertical, then concepts, phrases and/or keywords such as "food poisoning," "bad table location," etc. may be associated with the restaurant vertical, while entities that associate their business with an "auto repair shop" industry vertical may be associated with concepts, phrases and/or keywords such as "mechanic," "engine trouble," or "overcharged parts and labor costs."

As seen in FIG. 4, entity account data 315 received from the example user interface 300 may further comprise social media account data 325. The social media account associated with the social media account data 325 may comprise a social media account outlet for a business or a social media outlet for a customer. As non-limiting examples, social media account data 325 may comprise a social media type (e.g., Facebook, Twitter, Yelp, etc.), authentication information allowing the user to access one or more social media accounts (e.g., username, password), API access information for each social media account (e.g., a URL for the API, API documentation links, password information for accessing the API, etc.).

As a non-limiting example, this social media account data 325 may be used to access and review content within the entity's social media account(s) in order to identify concepts related to customer sentiment 335, 340, specific issues 345 related to negative sentiment 340, and recommended remedies 350 to the specific issues 345.

The server(s) 210 may be configured to identify, within social media, specific instances of concepts related to customer sentiment 335, 340, specific issues 345 related to negative customer sentiment 340, and recommended remedies 350 to the specific issues 345. These concepts may comprise any collection, aggregation and/or combination of tokens, keywords, phrases, associated concepts and/or any other concept properties and/or attributes and the relationships between them.

One non-limiting example approach to accomplish this may include defining a conceptual ontology for the keywords and/or phrases described herein. An ontology may be a representation of a set of concepts within a domain and the relationships between those concepts, and may include reason about and define the properties and/or attributes of the concepts.

Attributes of concepts may be used to describe the relationships between concepts. These relationships may describe the semantics concepts. As a non-limiting example, a relationship may be an attribute whose value is another concept in the ontology, or similar to another concept in the ontology, such as is-part-of, same-as, is-superclass-of, is-subclass-of, made-in, etc. The relationships between the individual and class concepts may be used to calculate the most closely related results in response to the received information which established the individual concept The server(s) 210 may be configured to receive, generate, store and/or analyze concepts and relationships related to customer sentiment 335, 340 about an entity's product and/or service. After receiving input, the server(s) 210 may be configured to identify, define relationships between and store the received concepts. For example, the input may include a text string generated by an entity, content within the admin's social media accounts, a plurality of crowd sourcing techniques and/or any combination of artificial intelligence, machine learning and fuzzy logic, as described herein.

The server(s) 210 may then be configured to split the text string in this example into tokens and define concepts based on this tokenized input. The tokenized input may be analyzed to determine whether the concepts represent a positive 335 or negative sentiment 340, a specific issue 345 and/or a recommended remedy 350 for the specific issue 345.

As non-limiting examples, the defined concept(s) may comprise or be defined by keywords and/or phrases indicating a customer's positive sentiment 335 (e.g., "great service," "delicious meal," "running great," "prompt service," etc.), negative sentiment 340 (e.g., "food poisoning," "long wait," "frequent breakdowns," "no show," etc.) or any other sentiment (e.g., "don't care," "not important," etc.).

Other concepts may comprise or be defined by keywords and/or phrases indicating a specific issue 345 caused by negative customer sentiment 340 (e.g., "never returning," "wouldn't recommend," etc.) and/or any possible recommended remedies 350 for the specific issue 345 (e.g., "solution," "fix," "what I've done in these situations," "what I would recommend," etc.).

The server(s) 210 may be configured to identify relationships between the concepts related to customer sentiment 335, 340, specific issues 345 related to negative sentiment 340, and recommended remedies 350 to the specific issues 345. For example, where a specific issue 345 has been identified, the server(s) 210 may identify relationships between the specific issue 345, the negative sentiment 340 that triggered the specific issue 345 and any recommended remedies 350 for the specific issue 345, as found in the content/text string(s). These relationships may be reflected in reports created for the admin, as described herein. In some embodiments, the server(s) 210 may be configured to store these concepts and their relationships in data storage 230

As a non-limiting example, the server(s) 210 may be configured to crawl social media to identify a thread representing a negative customer sentiment 340, and may analyze concepts, phrases and/or keywords within this thread to determine how users resolved specific problems. The server(s) 210 may be configured to create an association between the concepts, keywords and/or phrases from the negative sentiment 340 and the concepts, keywords and/or phrases associated with the recommended remedy 350. In some embodiments, these concepts and their relationships may be stored within the concept dictionary 330.

Several different methods may be employed to populate the concept dictionary 330 with concepts, identify the accuracy of the relationship between these stored concepts; and continue to improve the accuracy of these identified relationships. The dictionary of concepts 330 and relationships may be "seeded" by any means of data creation/aggregation known in the art. For example, in some embodiments, the dictionary of concepts and relationships may have been aggregated by a data aggregation service and may be purchased and integrated into data storage 230.

In some embodiments, the database may be populated via an automated web or social media crawler used in combination with fuzzy logic and other "intelligent/learning" software logic to identify the concepts to be stored in the concept dictionary 330. Crawling (also known as "spidering") may comprise the process of visiting one or more web pages (or one or more social media accounts associated with each of the admin accounts, as described herein) and reading the content to identify keywords within the content and/or identify an overall social sentiment towards a product or service. One or more web crawler modules (not shown) may visit/read the selected content, identify some or all keywords and/or social sentiment, analyze them to identify concepts, and/or store them as part of the aggregation within the concept dictionary 330.

As previously noted, other non-limiting examples of concept aggregation may include the concept dictionary 330 being populated by an admin, a plurality of crowd sourcing techniques and/or any combination of artificial intelligence, machine learning and fuzzy logic.

FIG. 4 shows a possible non-limiting example embodiment including an interface the admin may use to manually enter the concepts and their relationships into data storage 230. For example, the admin may enter repeated complaints they've seen within their social media accounts that they would like to be alerted to in the future. As new feedback and solutions to problems are identified, the admin may again access this user interface 300 and manually enter feedback and/or solutions.

Crowd sourcing techniques and/or any combination of artificial intelligence, machine learning and fuzzy logic may also be used to seed and refine the concept dictionary 330. For example, as social media content is continually crawled and/or as the concept dictionary 330 becomes increasingly populated, the software module(s) running on the server(s) 210 may improve the accuracy of the relationships between the concepts by analyzing the concepts and their relationships to identify concepts suspected of being associated with negative sentiment 340, specific issues 345 and/or recommended remedies 350.

In this example, the server(s) 210 may be configured to display these "suspect" concepts to the entit(ies) associated with the entity account(s) 310 (or other system users) to confirm these concepts and relationships. Based on input received from the user in response to the displayed suspect concepts, the system may then use machine learning to improve the accuracy the relationships between concepts.

As a non-limiting example, an entity may monitor resolutions of a specific actionable issue related to specific keywords in social media and/or stored in the concept dictionary 330 and identify which recommended remedy 350 was the most effective. The concept/keywords around this remedy may then be confirmed with the users and flagged in the software module(s) and/or the database, identifying it as the most effective remedy, which may become a high ranked recommended remedy 350 as described below.

Figure 5:
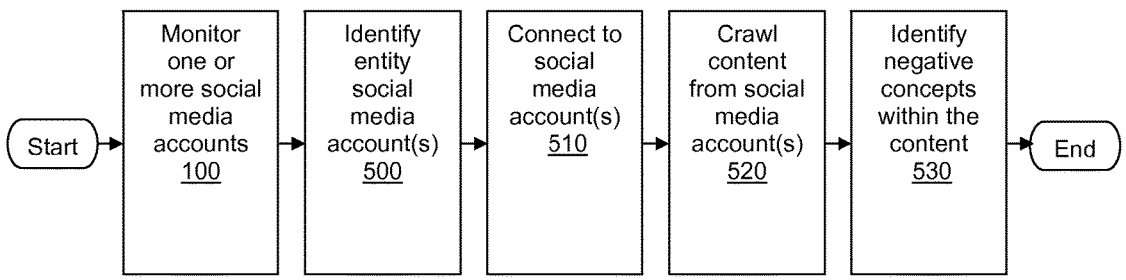
FIG. 5 is a flow diagram illustrating a possible embodiment of a method for monitoring social media for specific issues.

The server(s) 210 may be configured to monitor one or more social media accounts associated with one or more entities (Step 100). FIG. 5 illustrates that this may further include the steps of the server(s) 210: identifying social media account data 325 associated, in the database, with one or more entity accounts 310 (Step 500); connecting to the social media account(s) associated with the social media account data 325 (Step 510); crawling content within the social media account(s) (Step 520); and identifying one or more negative concepts within the content (Step 530).

In some embodiments, the server(s) 210 may utilize an API to connect to the social media account(s) (Step 510). The API may be accessed using the social media account data 325. An RPC may be sent to the API and the API may then return the requested information, such as content, from the entity's social media account(s) to the server(s) 210 for analysis. The server(s) 210 may crawl the content from the social media account(s) (Step 520) using any crawling techniques known in the art, such as that previously described.

The server(s) 210 may then analyze the crawled/returned content to identify one or more negative concepts (Step 530). In some embodiments, the customer sentiment 335, 340, the specific issue(s) 345 and the recommended remedy 350 to each of the specific issue(s) 345 may be identified by comparing the concepts, phrases and/or keywords within the content additional concepts, phrases and/or keywords within the content and/or with the concepts, phrases and/or keywords stored in the concept dictionary 330, and may determine concepts that share enough attributes to identify, within the posted feedback, one or more concepts, phrases and/or keywords associated with one or more instances of negative customer sentiment 340, specific issues 345 and/or recommended remedies 350.

In some embodiments, the identified concept may be saved in data storage 230 and flagged appropriately in order to refine/improve the artificial intelligence used to determine negative customer sentiment 340, specific issues 345 and/or recommended remedies 350. In some embodiments, the server(s) 210 may be configured to limit the analysis of the posted feedback to a specific industry in order to identify relevant concepts, phrases and/or keywords specific to that industry vertical. In some embodiments, the server(s) 210 may be configured to scan the content to determine keywords indicating an associated vertical and limit the search of associated concepts in the concept dictionary 330 accordingly.

Figure 6:
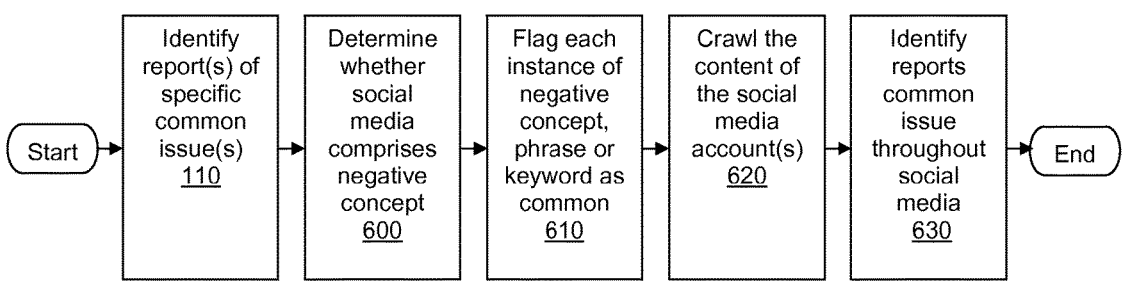
FIG. 6 is a flow diagram illustrating a possible embodiment of a method for monitoring social media for specific issues.

The server(s) 210 may be configured to identify, within one or more social media accounts, one or more reports of a specific issue 345 (Step 110). FIG. 6 illustrates that this may further include the steps of the server(s) 210: determining whether the social media content and/or data storage 230 comprises at least one additional instance of the negative concept, phrase and/or keyword (Step 600); and flagging each instance of the negative concept, phrase and/or keyword as a specific issue 345 common to the social media account(s) (Step 610).

The software running on the server(s) 210 may be configured to identify common issues throughout the negative customer sentiment 340 and/or specific issues 345 within the content of the social media account(s), and in some embodiments, may be stored in data storage 230. Common issues may comprise specific issues 345 that appear more than once within the content of the social media account(s) and/or within data storage 230. As a non-limiting example, to determine common issues, the server(s) 210 may be configured to identify a single concept, phrase and/or keyword within the social media content and/or within the stored records.

The server(s) 210 may then be configured to analyze the concept, phrase and/or keyword to determine if it was been associated with a positive or a negative sentiment and determine, for concepts identified as negative concepts, whether the social media content and/or the database comprises at least one additional instance of the negative concept. If so, the software running on the server(s) 210 may be configured to flag each instance of the negative concept, phrase or keyword as the common issue, which in some embodiments may be stored within the concept dictionary 330 in data storage 230.

In these embodiments, the server(s) 210 may be configured to flag the data records for the concept(s) by updating one or more data fields within the data record to indicate that the specific issue 345 related with the concept is an issue common to a specific entity account 310, common to all entity accounts 310 associated with a specific industry, and/or common to the entire body of entity accounts 310 throughout data storage 230.

FIG. 6 illustrates that the step of the server(s) 210 being configured to identify, within the social media account(s), reports of a specific issue 345 (Step 110) may further include the steps of the server(s) 210: crawling the content of the social media accounts (Step 620); and identifying the report(s) of the specific issue 345, comprising and/or being defined as a plurality of instances of the specific issue 345 found throughout the plurality of social media accounts (Step 630).

Once common issues have been identified as common to specific entity accounts 310, specific industry verticals and/or as common to the entire body of negative sentiment throughout the social media content and/or data storage 230, the servers(s) 210 may then be configured to monitor social media for specific instances of the common issue(s) by monitoring the content within each of the social media accounts for each of the entity accounts 310. The server(s) 210 may then be configured to crawl, possibly at regular intervals, the content of the social media accounts and identify, within the crawled content, at least one instance of the common issue reflected in the content of the social media accounts.

Figure 7:
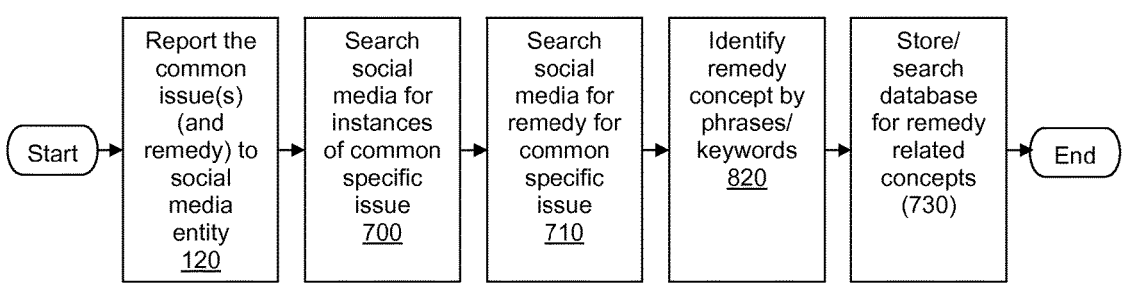
FIG. 7 is a flow diagram illustrating a possible embodiment of a method for monitoring social media for specific issues.

The server(s) 210 may be configured to identify one or more recommended remedies 350 for the report(s) of the specific issue (Step 120). FIG. 7 illustrates that this may further include the steps of the server(s) 210: searching the social media for: each instance of the specific issue 345 (Step 700); and the recommended remedy 350 for each instance of the specific issue 345 (Step 710). The server(s) may search the recommended remedy 350 by identifying, within the social media content, a remedy-related concept, phrase and/or keyword (Step 710). The server(s) 210 may use the identified remedy-related concept, phrase and/or keyword to search the social media content for the recommended remedy 350 (Step 720).

In some embodiments, the server(s) 210 may be configured to store, in association with the specific issue 345, the remedy-related concept, phrase and/or keyword in data storage 230, possibly within the concept dictionary 330. In these embodiments, when the server(s) 210 search the social media content for the remedy-related concept, phrase and/or keyword, they may also search the remedy-related concepts stored in data storage 230 in association with the specific issue 345 (Step 730).

As with the method steps for identifying common issues and instances of specific actionable issues 345 in social media content, the server(s) 210 may be configured to analyze the social media content, specifically concepts, phrases and/or keywords within the same threads of social media content to identify recommended remedies 350 associated with specific instances of the specific issue(s) 345. The server(s) 210 may analyze concepts, phrases and/or keywords within threads of the posted feedback that track identified instances of specific issues 345 and determine how users resolved specific problems. The server(s) 210 may create, and store in some embodiments, an association between the concepts, phrases and/or keywords from the negative sentiment 340 and the concepts, phrases and/or keywords associated with the recommended remedy 350.

As noted above, the recommended remedies 350 may be populated, analyzed and flagged within the concept dictionary by receiving input from an admin, a plurality of crowd sourcing techniques and/or a plurality of artificial intelligence, machine learning and/or fuzzy logic, as described herein. As with the steps identifying common issues, the server(s) 210 may be configured to limit the analysis of the social media content to a specific industry in order to identify relevant concepts, phrases and/or keywords specific to that industry, as previously described.

As specific instances of issues 345 are identified within the social media content, the server(s) 210 may be further configured to crawl the social media content to determine if there is a recommended remedy 350 in association with the negative sentiment 340 and/or common issue, and the system may analyze the recommended remedies 350 to determine/rank the most effective or frequent recommended remedies 350.

Once identified, the server(s) 210 may be configured to analyze concepts, phrases and/or keywords that identify the best solution(s) to the identified instance of the specific issue(s) 345. The server(s) 210 may be further configured to monitor "suspect" recommended remedies 350, and apply the crowd sourcing techniques and/or any combination of artificial intelligence, machine learning and fuzzy logic to refine the recommended remedies 350 over time.

In some embodiments, one or more business partners of other products, which may include productivity apps, may be used to populate the concept dictionary 330 with recommended remedies 350. As a non-limiting example, a partnership may exist with Open Table for reservations. Invoicing options and/or other online solutions may also be included to fix the identified problems.

The server(s) 210 may be configured to report, to an entity associated with one or more social media accounts, the specific issue 345 and/or the one or more recommended remedies 350 (Step 120).

The server(s) 210 may be configured to generate and transmit, to a client computer 220 operated by the user, a report including any combination of instances of common issues and/or recommended remedies 350 found in the entity's social media content. The generated report may be sent, as non-limiting examples, via email, SMS, an alert on a web page and/or user interface 300 accessible only to the entity via the business website(s) 305, an individual message sent to the entity via their social media accounts, etc.

In some embodiments, a pre-determined threshold may be set within the entity account 310 settings allowing the entity to determine a specific number of instances of common issues that must be found within the entity's social media content before a report is generated and sent to the entity.

In some embodiments, the data generated for the report may be analyzed and ranked, so that the common issues determined to be the most critical and/or the recommended remedies 350 determined to be the most effective are listed first.

The steps included in the embodiments illustrated and described in relation to FIGS. 1-7 are not limited to the embodiment shown in FIGS. 1-7 and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising the steps of:
   receiving, by a server computer coupled to a network and comprising a processor executing instructions stored in a memory, from a user interface displayed on a client computer coupled to the network:
      an industry associated with a product or business;
      a social media account data for accessing a social media account associated with the product or business;
   selecting, by the server computer, from a database coupled to the network, a negative sentiment data record associated in the database with the industry and including a token or keyword phrase expressing negative sentiment, wherein the token or keyword phrase expressing the negative sentiment is:
      determined by crawling a content of the social media account; and
      stored within a dictionary of data concepts comprising a conceptual ontology defining a plurality of concepts and the relationships between the plurality of concepts comprising a positive sentiment, a negative sentiment, at least one specific issue, and at least one solution to the at least one specific issue;
   accessing, by the server computer, the social media account using the social media account data;
   responsive to a determination that a thread in the social media account includes at least one recurrence of the token or keyword phrase expressing negative sentiment:
      selecting, by the server computer, from the database, a recommended solution data record associated in the database with the negative sentiment data record, and including:
         a solution to the token or keyword phrase expressing negative sentiment; and
         a data field identifying the solution as a high ranked solution within the industry; and
      generating, by the server computer, for display on the client computer, a report including:
         the at least one recurrence of the token or keyword phrase expressing negative sentiment; and
         for each of the at least one recurrence, the high ranked solution within the industry.

2. The method of claim 1, wherein the social media account is accessed using an application programming interface.

3. The method of claim 1, wherein the plurality of concepts are aggregated from at least one input received from a user interface, a feedback generated by crowd sourcing applied to the at least one input; or machine learning applied to the at least one input or the feedback.

4. The method of claim 1, wherein the plurality of concepts are aggregated by a data aggregation service or generated by a web crawl applying machine learning or fuzzy logic.

5. A system comprising a server computer coupled to a network and comprising at least one processor executing instructions in a memory, the instructions causing the server computer to:
   receive, from a user interface displayed on a client computer coupled to the network:
      an industry associated with a product or business; and
      a social media account data for accessing a social media account;
   select, from a database coupled to the network, a negative sentiment data record associated in the database with the industry and including a token or keyword phrase expressing negative sentiment, wherein the token or keyword phrase expressing the negative sentiment is:
      determined by crawling a content of the social media account; and
      stored within a dictionary of data concepts comprising a conceptual ontology defining a plurality of concepts and the relationships between the plurality of concepts comprising a positive sentiment, a negative sentiment, at least one specific issue, and at least one solution to the at least one specific issue;
   access the social media account using the social media account data;
   responsive to a determination that a thread in the social media account includes at least one recurrence of the token or keyword phrase expressing negative sentiment:
      select, from the database, a recommended solution data record associated in the database with the negative sentiment data record, and including:
         a solution to the token or keyword phrase expressing negative sentiment; and
         a data field identifying the solution as a high ranked solution within the industry; and
      generate, for display on the client computer, a report including:
         the at least one recurrence of the token or keyword phrase expressing negative sentiment; and
         for each of the at least one recurrence, the high ranked solution within the industry.

6. The system of claim 5, wherein the social media account is accessed using an application programming interface.

7. The system of claim 5, wherein the plurality of concepts are aggregated from at least one input received from a user interface, a feedback generated by crowd sourcing applied to the at least one input; or machine learning applied to the at least one input or the feedback.

8. The system of claim 5, wherein the plurality of concepts are aggregated by a data aggregation service or generated by a web crawl applying machine learning or fuzzy logic.

* * * * *